US006616107B1

(12) United States Patent
Hargreaves

(10) Patent No.: US 6,616,107 B1
(45) Date of Patent: Sep. 9, 2003

(54) CLAMP, CLAMPING MEANS, AND METHOD OF CLAMPING

(75) Inventor: Karl Michael Hargreaves, Calne (GB)

(73) Assignee: Karmilok Limited, Calne (GB)

( * ) Notice: Subject to any disclaimer, the term of this patent is extended or adjusted under 35 U.S.C. 154(b) by 0 days.

(21) Appl. No.: 09/155,385

(22) PCT Filed: Mar. 27, 1997

(86) PCT No.: PCT/GB97/00896

§ 371 (c)(1),
(2), (4) Date: Jan. 12, 1999

(87) PCT Pub. No.: WO97/38194

PCT Pub. Date: Oct. 16, 1997

(30) Foreign Application Priority Data

Apr. 3, 1996 (GB) .............................................. 9607027
Oct. 24, 1996 (GB) .............................................. 9622033

(51) Int. Cl.$^7$ .................................................. F16L 3/22
(52) U.S. Cl. .......................... 248/68.1; 248/74.3; 70/16
(58) Field of Search ........................... 248/68.1, 226.12, 248/302, 925, 72.1, 70, 73, 71, 74.3, 230.8, 229.17, 228.8, 74.1, 74.2; 70/15, 16, 17; 24/16 R, 16 PB, 30.5 R

(56) References Cited

U.S. PATENT DOCUMENTS 2,469,592 A * 5/1949 Byer ............................ 70/65
4,306,698 A * 12/1981 Gonia et al. .............. 248/74 X
4,665,588 A * 5/1987 Nakano .................... 24/16 PB
4,854,138 A * 8/1989 Charland ....................... 70/16
5,016,842 A * 5/1991 Suzuki et al. .............. 248/68.1
5,102,399 A * 4/1992 Chu .......................... 604/250
5,160,106 A * 11/1992 Monick ................... 248/231.7
5,279,485 A * 1/1994 Georges .................... 248/68.1
5,301,907 A * 4/1994 Julian ........................ 248/74.1
5,615,851 A * 4/1997 LeBeau ....................... 248/73
5,651,376 A * 7/1997 Thompson .................. 128/878

* cited by examiner

*Primary Examiner*—Ramon O. Ramirez
*Assistant Examiner*—A. Joseph Wujciak
(74) *Attorney, Agent, or Firm*—Michael, Best & Friedrich, LLC

(57) ABSTRACT

A clamp, clamping means incorporating the clamp, and a method of clamping are disclosed. The clamp includes means for clamping a securing tie therein, together with means for attachment to a surface, and, in combination with a securing tie, provides a clamping means suitable for clamping objects to a fixed point.

14 Claims, 5 Drawing Sheets

FIG. 4a
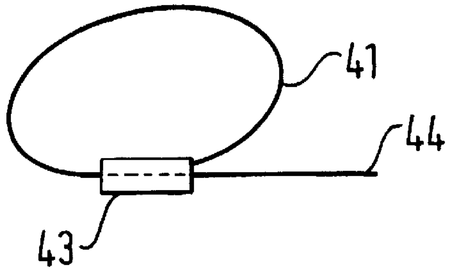
FIG. 4b
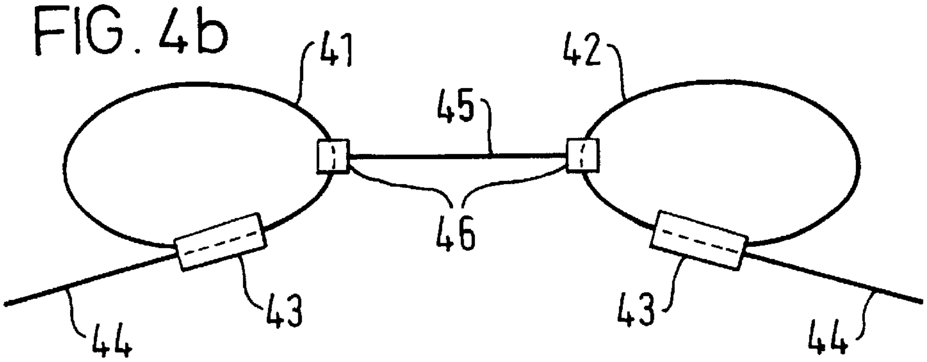
FIG. 4c
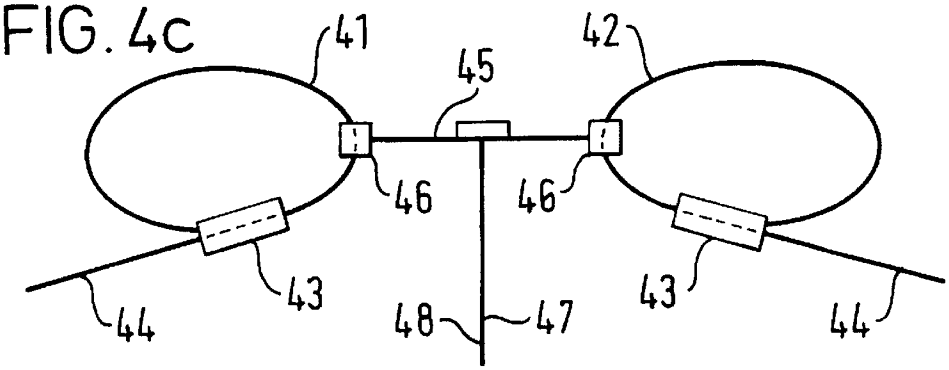
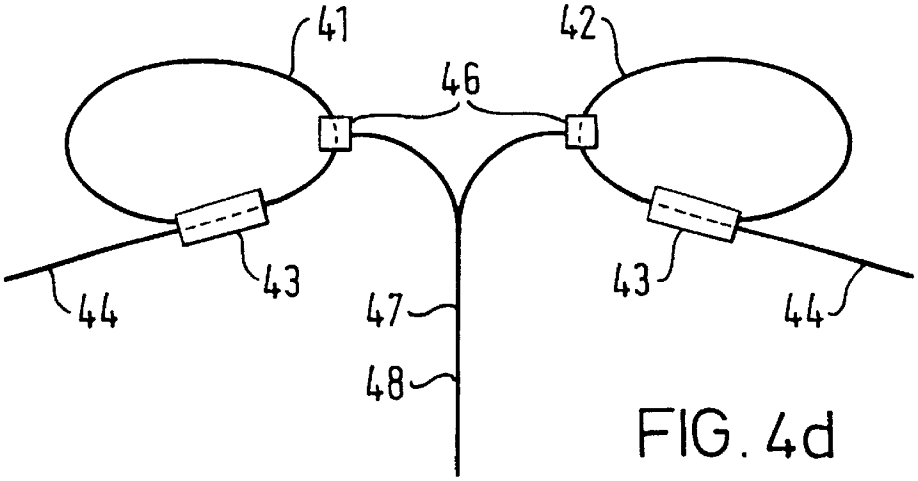
FIG. 4d

FIG. 5a
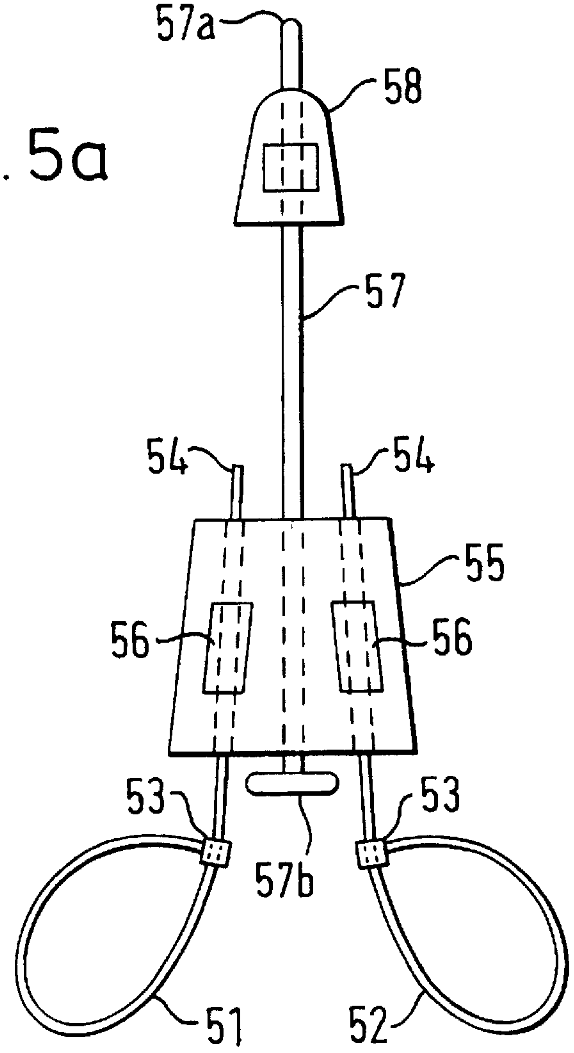
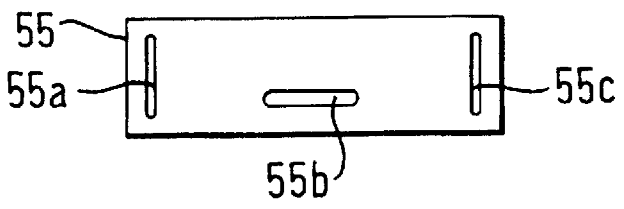
FIG. 5b

CLAMP, CLAMPING MEANS, AND METHOD OF CLAMPING

This application relates to a clamp, and a clamping means incorporating the clamp. This application also relates to a method of clamping, in particular, a method of clamping an object, person, or animal to a desired point or surface.

The invention utilises securing ties. In this application the term "securing tie" is used as a generic description for ties, typically made of plastics (such as nylons) or stainless steel, used widely in industry (for example, cable ties, hose ties, identification ties, binding or bundling straps or pull-tight (security) seals), but equally capable of being made from other materials, such as twine, wire, leather or cloth. However any similar securing means may be used.

Securing ties have previously been used inter alia to encircle bundles of wires, cables, pipes, tubes, hoses and suchlike in order to fasten such bundles together and for sealing bags or containers. In particular, several securing ties may be used at intervals over the length of the bundle to ensure that the bundle is kept together over its whole length.

In general, but not exclusively, a securing tie is formed of a long thin strip of flexible material such as plastic. At one end of the securing tie may be formed a head housing having an opening formed therein which is dimensioned so that the strip may be threaded through it.

Securing ties are generally arranged such that when the strip is threaded through the head housing, a locking part in the head housing acts so that the size of the resulting loop may only be reduced. One known means for achieving this is to form on one side of the plastic strip a plurality of ridges arranged perpendicularly to the lengthwise direction of the securing tie. The head housing is arranged to have a locking part protruding into the opening such that, when the strip is threaded through the opening, the protruding part interacts with the ridges on the strip so as to allow movement of the strip through the head in one direction, but to prevent or to substantially restrict movement of the strip through the head in the opposite direction.

Some previously available securing ties are provided with loosening mechanisms within the head housing which, when operated, enable the strip and head housing to move relative to each other so as to increase the size of the loop.

Furthermore, it is known that securing ties can be designed to be smooth on both sides, or to be provided with various combinations of smooth, ridged or serrated surfaces. In each case, the locking part is chosen accordingly.

A first application of the invention relates to a clamp, and a clamping means incorporating the clamp suitable for temporarily restraining people. This first application of the invention is particularly suitable for use by law enforcement officers or medical staff in temporarily restraining people.

In law enforcement work there is a need for an effective restraining means for restraining a person in order to prevent escape of that person or to minimise the possibility of that person endangering police officers, members of the public, or themselves. Previously, metal handcuffs have been used to handcuff such persons to a police officer, or to handcuff together the hands of the person.

While in an open or unsecure environment, such as on a street or in a private home, a temporary restraint is needed to enable the person to be taken into custody by the police in order that a controlled transfer to a secure environment, such as a police car or police station, can be made.

An example of a temporary restrainer is shown in FIG. 1. This restrainer is formed from first and second portions 1, 2 which are securely joined together by a bridging portion 3.

First and second portions 1, 2 have respective head ends 4*a*, 4*b* and tail ends 5*a*, 5*b*. In this restrainer the first and second portions are formed from readily available securing ties.

The restrainer shown in FIG. 1 comprises two securing ties which form the first and second portions, where the head housing of the securing tie respectively forms the head end of the first and second portions 1, 2. The other end of the securing tie, forming the tail end of the first and second portions 1, 2, is threaded through the respective head housing at the head ends, 4*a*, 4*b*, to form a loop in such a way that the protruding part in the head housing at the head ends 4*a*, 4*b* and the ridges on the respective strips act together so that the head ends 4*a*, 4*b* can move relative to the first and second strip portions 1, 2 so that the size of the loop may be reduced, but may not easily be increased.

A method of restraining people, which might be used in situations in which a person is to be taken into custody by the police, in which the restrainer shown in FIG. 1 is used, will now be described.

Any situation in which a person is being taken into custody by the police involves a certain element of risk especially in an 'open' situation such as the street. An example of such a situation is where a person suspected of a crime has been chased by the police and is surrendering. Potentially, in such situations the person to be taken into custody is armed, or appears to be armed. A procedure which may be used to take somebody into custody, involves instructing the person to lie on the ground with their hands visible, whereupon a police officer is able to approach the person to be taken into custody and restrain them using the temporary restrainer described above with reference to FIG. 1. To achieve this restraint, the loops formed by first and second portions 1, 2 are slipped over the hands of the person to be taken into custody, and the head ends 4*a*, 4*b* are moved relative to the first and second portion until the loops tighten sufficiently that the loops cannot be slipped off the person's wrists. At this time the person is effectively restrained by this restrainer, and can then be taken into custody by the police in a controlled manner.

However, the procedure outlined above can expose the police officer to risk, since it is necessary for a police officer with the restrainer to approach the person to be taken into custody in order to place the restrainer over the wrists. The police officer is particularly vulnerable at this time, and may be shot at or attacked with a knife as he approaches the suspect if the suspect is concealing a knife or gun.

If it is necessary to take a number of people into custody simultaneously it is difficult to restrain one if the others do not wish to be taken into custody.

The present invention seeks to provide a new method of securing a person, and a new clamp and clamping means to secure a person to a surface or a fixed point.

A second application of the invention relates to a method and means of securing an object to a fixed point or surface.

Previously, mounting bases for use with cable ties have been provided. The prior art mounting bases are mounted on a surface by means of screws or have been provided with a self-adhesive base. In order to secure an object to a surface by means of the prior art mounting base, the cable tie is passed underneath the mounting base and around the object to be secured. The tail end of the cable tie is passed through the head housing and tightened so as to secure the object.

A third application of the invention relates to a method and means of securing an animal to a fixed point.

According to the present invention, there is provided a clamp having means for attachment to a surface, and means adapted for receiving and locking a securing tie means therein.

The means adapted for receiving and locking a securing tie means therein preferably comprises means for receiving and locking a securing tie or cable tie therein.

According to the present invention, there is provided a clamping means comprising: a securing tie means; and a separate clamp having means for attachment to a surface, and means adapted for receiving and locking the securing tie means therein.

According to the present invention, there is provided a clamping means for clamping an object to a surface, comprising: a securing tie means having a locking part, which securing tie means, in use, secures the object; and a clamp having means for attachment to the surface, and means adapted for receiving and locking the securing tie means therein.

According to the present invention, there is provided a clamping means for clamping an object to a surface, comprising: a securing tie means at least part of which may be formed into a loop which, in use, is locked using a locking part so as to secure the object; and a clamp having means for attachment to the surface, and means adapted for receiving and locking the securing tie means therein.

According to the present invention, there is provided a clamping means comprising a clamp together with securing tie means which co-operates with the clamp so as to enable a person to be securely restrained, with or without the intervention of another person.

According to the present invention, there is provided a motor vehicle, or other secure means, having a clamp or clamping means according to this invention secured thereto.

The secure means may be a building or the road or other immovable object, or a substantially fixed structure such as an oil rig.

The invention may be used to secure an object, a person or an animal, and in the following description the word "object" refers in general also to a limb or other part of a person or animal.

The securing tie means is formed separately from the clamp. This provides flexibility during use of the invention. In particular the object or person can be secured initially by the securing tie means, and can be locked subsequently by the clamp. This aspect of the invention is of particular value in security applications of the invention, since in this way a person to be taken into custody, or an animal, can be restrained at any location by use of the securing tie means, and then moved in a controlled manner to a suitably located clamp. In other applications, an object to be secured can first be bound by a securing tie means and subsequently be secured to a fixed point by locking the securing tie means to a clamp secured at that point.

The means for attachment to a surface may comprise means to attach the securing tie means permanently to the surface, or means to attach the securing tie means temporarily to the surface.

The means for attachment to a surface may be adapted to the characteristics of the surface, and a range of clamps may be provided having different attachment means suitable for different surfaces or for different uses of the clamp. In particular, the clamp may be provided with means for attachment to a surface comprising, but not limited to,: bolts or screws; contact cement; a securing tie for attachment to, for example, a post, bar or railings; a suction pad; glue; a clip or clips, or other fasteners.

Means adapted for receiving and locking the securing tie means in the clamp may comprise any means capable of performing this task. In particular, the means adapted for locking the securing tie means may comprise a friction locking device for locking a smooth part of the securing tie means, or may comprise a pawl for interacting with a serrated part of a securing means, but is not limited thereto. The means adapted to lock a securing tie means may preferably lock the securing tie means by means of a mechanism operating in the same manner as the locking of the securing tie around the object.

The means adapted for receiving and locking a securing tie means therein preferably includes an enclosed channel through which at least part of the securing tie means is passed, and a locking means located within the channel for locking at least part of the securing tie means therein.

The locking means may be arranged so as to restrict or prevent movement of the securing tie means in a direction opposite to the direction in which it was inserted.

The channel is preferably dimensioned so as to receive snugly the securing tie means therein.

The channel and locking means may be formed to receive a number of differently sized securing tie means. Alternatively, the clamp may have formed therein a plurality of differently sized channels and locking means, so as to enable the reception of a number of differently sized securing tie means. In these ways a single clamp can be provided which may be used with different sizes of securing tie means.

Advantageously the entrance to one end of the channel is larger than the other. This feature will facilitate the reception of at least part of the securing tie means into the channel, so making the use of the invention quicker and easier. This point may be of particular relevance in the security application of this invention, in which a smooth and efficient insertion of the securing tie means into the clamp is of great importance.

The clamp means may also advantageously be shaped or marked to indicate a preferred direction of insertion of the part of the securing tie means into the clamp.

The locking means is preferably arranged so as to securely lock the securing tie means regardless of the orientation of the securing tie means. This feature simplifies the use of the clamp or clamping means, since it is not necessary to examine the securing tie means to determine its orientation prior to insertion in the clamp.

The locking means may be permanently fixed within the clamp, for example by being formed integrally therewith, or may be removable therefrom. A removable locking means enables the replacement of worn-out locking means, or, if the replacement locking means is adapted to lock a different type or size of securing means, enables a single clamp to be used to clamp a number of different securing means. The ability to replace worn-out locking means is particular useful in applications in which it is critical that each successive clamping operation reliably results in a secure clamp, for example in the security aspects of this invention.

Preferably, in applications of the invention in which the locking means is subject to great strain, the locking means has a plurality of locking points.

In one embodiment of the invention, a removable unit comprising the locking means can be inserted into the body of the clamp body housing, preferably from the side.

A removable locking means 27 can be inserted into channel 26 (FIG. 3) or 56 (FIG. 5*a*) which is transverse to the body housing 21 of clamp 20 so that the insertion may be made from the side of the body housing.

Means for preventing the removal of the unit containing the locking means may be provided in applications in which the unauthorised or accidental removal of the unit containing the locking means is undesirable, for example in safety- or security-critical applications.

The securing tie means may be arranged so as to form at least one loop which, during a securing operation, may be made smaller but may not be made larger, or may be made larger only with difficulty. The securing tie means may form a loop which is sufficiently large to encompass the object to be secured, for example a person's hand or a bundle of wires.

In general, however, the securing tie means and the clamp may co-operate such that a force exerted from inside the loop formed by a securing tie causes the loop to be made smaller whilst the securing tie means remains secured to the clamp.

In some embodiments it may be advantageous to allow the release of the securing tie means once the object is to be released by means of the provision of a release mechanism. Obviously the release mechanism should be arranged so that it cannot operate unintentionally.

The securing tie means may comprise at least one securing tie. The or each securing tie may have a head part with the locking part contained therein, and a tail part which may be secured by the locking part. The tail part may be locked by the locking means in the clamp. The locking means in the clamp may accordingly operate in the same way as the locking part in the head part. In particular, when a securing tie having an elongate serrated strap is used, the locking means and locking part may both comprise a pawl disposed in an aperture for engaging the strap serrations when the strap is inserted into the aperture.

In particular the securing tie means may be arranged so that the head part of a securing tie can be moved along the securing tie in a first direction, but is prevented from being moved along the securing tie in a second direction. The second direction is advantageously opposite the first direction.

The securing tie means may comprise two securing ties cooperating with an intermediate locking block, the intermediate locking block having means to enable the intermediate locking block to be secured to the clamp.

The means to enable the intermediate locking block to be secured to the clamp may comprise an integrally formed securing tie, or may comprise a channel through which a further securing tie may be passed. This arrangement is particularly useful where two securing ties are used together, for example, when hand- or leg-cuffing a person to be taken into custody, or to secure a pair of, for example, pipes or other similar objects, to a fixed point.

According to the present invention, there is provided a fastening assembly comprising a tie having an elongate serrated strap, an apertured head at one end of the strap and a pawl disposed in the head aperture for engaging the strap serrations when the strap is inserted through the head aperture, in. combination with a separate clamp for attaching to a surface, the clamp comprising an aperture and a pawl disposed in the clamp aperture for engaging the strap serrations of the tie when the strap of the tie is inserted through the clamp aperture.

A method of securing an object to a surface in accordance with the invention comprises the steps of: firstly securing the object with a securing tie means, and secondly clamping the secured object to a clamp fixed to the surface.

A method of securing a person to a fixed point in accordance with the invention comprises the steps of securing at least one part of the person with a securing tie means; and locking the securing tie means to a clamp fixed to the fixed point.

The securing method in accordance with the invention may involve the initial step of attaching/fixing the clamp to the surface or fixed point.

The securing method in accordance with the invention may involve the preparation of a securing tie means suitable for restraining a limb or other part of a person or animal, which has at least one loop for reception of such a limb or part, and which loop is arranged such that pressure exerted on the loop causes the loop to reduce in size, and thus secure the limb.

The method may also include the step of instructing or forcing a person or animal to place a limb or another part of the body within a loop formed by the securing tie means and to apply such a pressure.

The method may also include the step of releasing the securing tie means from the clamp.

When the invention is used in other applications, an object to be secured can first be bound by a securing tie means and subsequently secured to a fixed point by locking the securing tie means to a clamp.

According to the present invention, there is provided a method of securing a person or object comprising the steps of providing a cable tie having an elongate serrated strap, an apertured head at one end of the strap and a pawl disposed in the head aperture, forming the strap into a loop, inserting the free end of the strap through the head aperture such that a pawl therein engages the strap serrations, providing a separate clamp attached to a surface, and inserting the free end of the tie into an aperture in the head, such that a pawl therein engages the strap serrations.

For a better understanding of the present invention, and to show how it may be brought into effect, reference will now be made, by way of example, to the accompanying drawings in which.

FIGS. 4*a*–4*d* show a number of different embodiments of the securing tie means of the present invention;

FIG. 5*a* shows an embodiment of clamping means in accordance with the invention; and FIG. 5*b* shows an end view of an intermediate locking block forming part of the clamping means shown in FIG. 5*a;*

Figure 6:
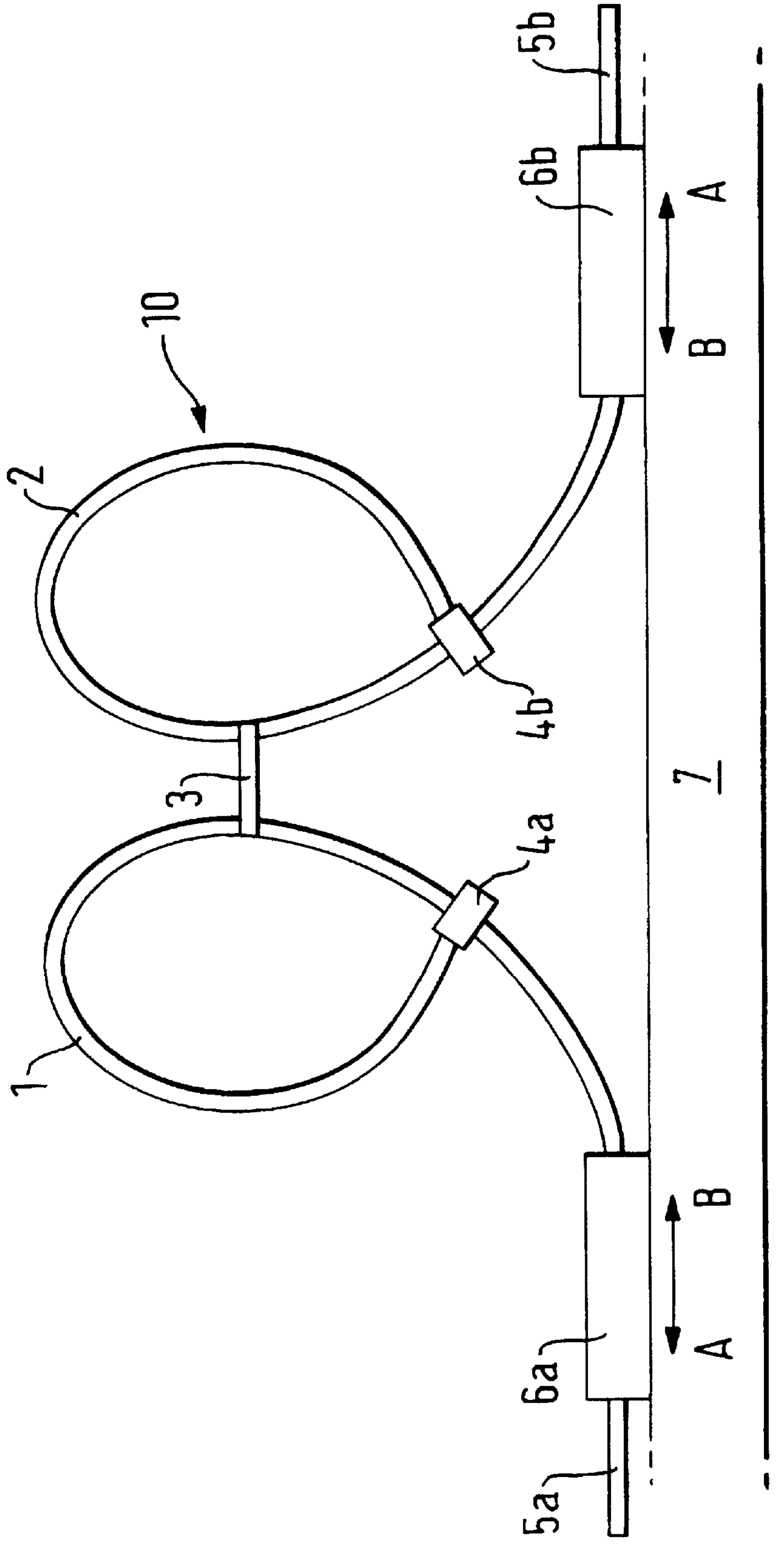

FIG. 6 shows a further embodiment of the clamping means in accordance with the present invention.

A clamp in accordance with the invention will now be described with reference to FIGS. 2 and 3.

Figure 2:
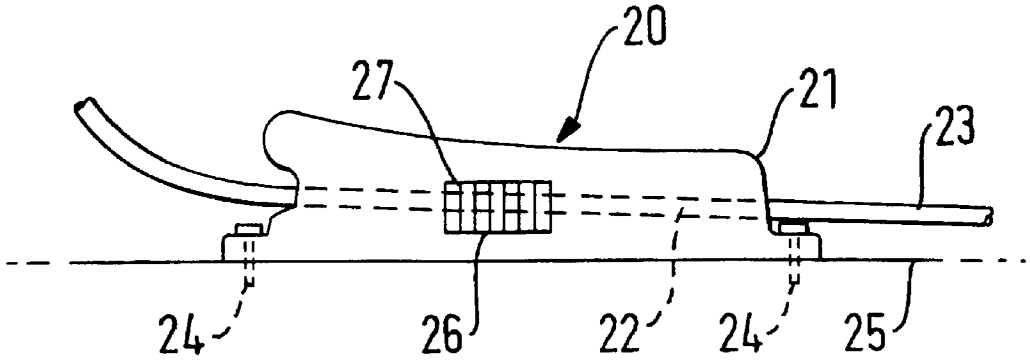
FIG. 2 shows a side view of one embodiment of a clamp in accordance with the invention.

FIG. 2 shows a clamp 20 in accordance with one embodiment of the invention. The clamp comprises a body 21 having formed therein a channel 22 dimensioned to receive therein a securing tie 23.

Figure 3:
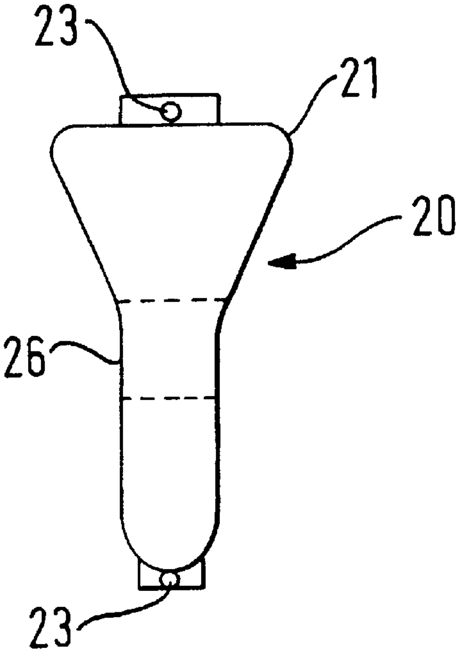
FIG. 3 shows a view from above of the clamp shown in FIG. 2.

As is most clearly seen in FIG. 3, the body 21 of the illustrated clamp 20 is flared towards the one end of the body. In this way a wider entry point for the securing tie 23 into the channel 22 is provided.

The body 21 of the clamp has fastening means 24 for securing the clamp 20 to a surface 25. The body has a locking means 26 disposed therein which is adapted to lock the securing tie and thereby prevent reverse movement of the securing tie out of the channel. The locking means 26 has a plurality of locking points 27 so as to distribute the locking force over a length of the securing tie 23, thus reducing the risk of failure of the locking means 26.

The locking means 26 may be removable from the body 21 of the clamp 20.

A number of different embodiments of the securing tie means of the present invention are shown in FIGS. 4*a*–4*d*. In general, the described embodiments of the securing tie means are equally suitable for use in securing an object to a surface, or for securing the limb of a person in accordance with the differing uses of the invention as set out in this application, and the description should be read accordingly.

In the described embodiments a securing tie such as a cable tie is illustrated. However, the invention is not limited to the use of cable ties and their associated locking mechanisms. The securing tie in this embodiment has a elongate serrated strap, but other embodiments having, for example a smooth strap, are possible in accordance with the invention.

The simplest embodiment of the securing tie means of the present invention is shown in FIG. 4*a*, and comprises a single securing tie 41. The tail end 44 of the securing tie is fed through the head housing 43 of the securing tie 41 to form a loop.

In the embodiment of the securing tie means shown in FIG. 4*b*, two securing ties 41,42 are formed in a loop by threading the tail ends of the securing ties 41,42 into the respective securing tie head housing 43. The two securing ties 41,42 are linked by a linking portion 45, having ends 46. The linking portion ends 46 may be freely movable along the securing ties 41,42 or may be fixed thereon.

The embodiment of the securing tie means shown in FIG. 4*c* is similar to the embodiment shown in FIG. 4*b*, in that two securing ties 41,42, linked by a linking portion 45 having ends 46, are each formed in a loop by threading the tail ends of the securing ties 41,42 into the respective securing tie head housing 43. A further securing tie 47 is provided which cooperates with the linking portion 45 to provide a securing tail end 48.

The embodiment of the securing tie means shown in FIG. 4*d* is similar to the embodiment shown in FIG. 4*c*. However, in this embodiment, a double-headed securing means 47 is provided having a securing tail end 48 and ends 46 attached to two securing ties 41,42, each formed in a loop by threading the tail ends of the securing ties 41,42 into the respective securing tie head housing 43.

In each of the above embodiments of the securing tie means, the loop may either be formed around the object, or the object may be inserted into or threaded through the loop once formed. The head housing 43 forms a locking part adapted to lock the securing tie means of this embodiment around the object to be secured. In addition, although it is preferable that the clamp is secured to the surface prior to the clamping of the tail end 44 or 48 in the clamp, in some embodiments the securing tie means may be clamped to the clamp prior to the clamp being secured to the surface. The tail end 44 of the securing tie 41 and/or 42, or tail end 48, cooperates with a clamp secured to a surface in order to clamp the object to the surface.

It is clear that the above-described clamps and securing tie means can be used advantageously for any application. In particular the above-described clamps and securing tie means can be used to clamp any object or a person or an animal to a surface.

An embodiment of the clamping means in accordance with the invention will now be described with reference to FIGS. 5*a* and 5*b*.

In this embodiment, two securing ties 51,52 are formed in a loop by threading the tail ends of the securing ties 51,52 into the respective securing tie head housing 53. The tail ends 54 are threaded through respective channels, having openings 55*a*,55*c*, within an intermediate locking block 55, and are secured therein by means of a locking 56 within the respective channel. A further securing tie 57 having a securing tail end 57*a* be threaded through a further channel having an opening 55*b*. The securing tail end 57*a* cooperates with the clamp 58 to clamp the securing tie means to the clamp 58.

A further embodiment of the clamping means in accordance with the present invention will now be described with reference to FIG. 6. This embodiment of the invention is described to illustrate a security application of the invention, but it will be clear that the principles of the apparatus and method which are described are applicable to other applications of the invention.

In the embodiment described below, for ease of reference, the securing tie means used is the same as that described with respect to FIG. 1.

Figure 1:
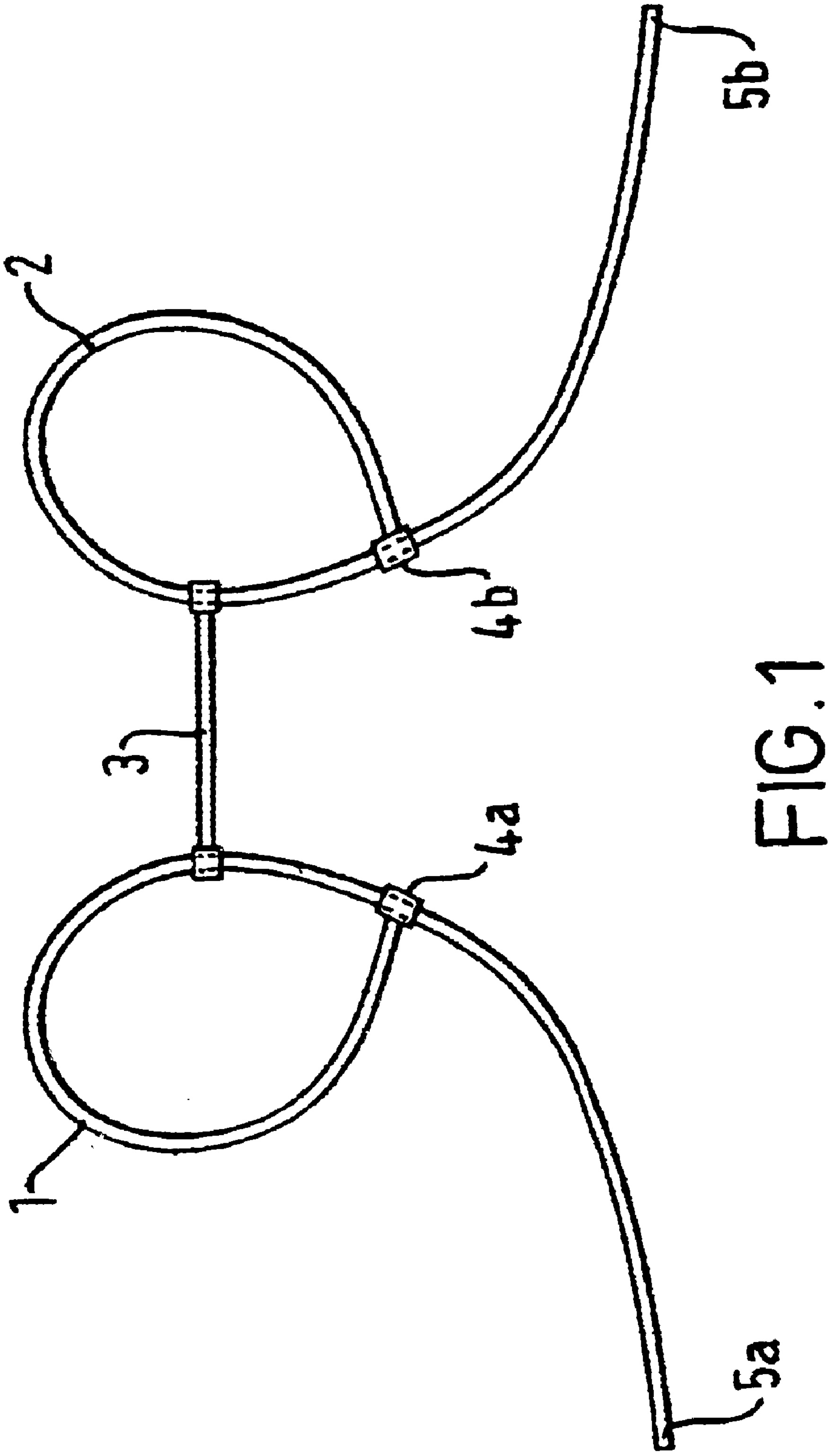
FIG. 1 PRIOR ART
FIG. 1 shows a prior art temporary restrainer.

FIG. 6 shows a clamping means 10, shown in FIG. 1. The second ends of the first and second portions 1 and 2 are threaded through clamps 6*a* and 6*b* which are attached to the surface of a secure object 7.

A secure object is an object which cannot be moved by a person, or which would severely hamper or restrict a person's movements. An example of a secure object would be a car or the wall of a building.

The clamps 6*a* and 6*b* comprise means so as to securely fasten the clamps 6*a* and 6*b* to the surface of the secure means 7. The clamps 6*a* and 6*b* have a channel therethrough and have locking means disposed therein. The locking means are similar to the head ends 4*a*, 4*b* and consist of a passage co-operating with a protruding part so as to enable the relative movement of the clamps 6*a*, 6*b* and the first and second portions 1, 2 respectively in one direction, and to prevent movement in the other. Specifically, as shown in FIG. 6, the clamps 6*a*, 6*b* allow the ends 5*a*, 5*b* of the securing tie to be moved relative to clamps 6*a*, 6*b*, respectively, in direction A, but prevent movement in direction B.

A method of restraining a person, for example a person to be taken into custody, with the apparatus of the invention as shown in FIG. 6 will now be described.

Clamps 6*a*, 6*b* are permanently provided on the surface of an appropriate secure means 7 or may be securely fastened thereto prior to the restraint of the person. In this exemplary method the secure means 7 is a police car, and clamps 6*a*, 6*b* are provided at suitable points on the police car. For example clamps, or positions suitable for the fixing of the clamp to the surface, may be provided above the doors, or on the boot or bonnet, or on a wing of the police car.

The clamps are attached securely to the secure means 7, for example by means of a nut and bolt. In the case of a police car, the clamps are advantageously permanently bolted onto the car. The clamps should be attached to the car at a point which is easily accessible and which will withstand forces exerted thereon by a person secured thereto. The clamps are preferably bolted to the frame of the car.

In order to take a person into custody, the hands of the person are placed through the loops in the first and second portions 1, 2, and then their wrists are moved in a direction such that the head ends 4*a* and 4*b* are caused to move along the first and second portion 1, 2 in order to reduce the size of the loops until the loops fit tightly over their wrists, and cannot slip over the hands. The clamping means is arranged so that the head ends 4*a*, 4*b* are able to slide over the first and second portions 1, 2 to make the loops tighter.

Once the person to be taken into custody is restrained in this way, the tail ends 5*a* and 5*b* of the securing tie means are inserted in the clamps 6*a*, 6*b* and securely clamped therein. Once clamped, the securing ties means is prevented from moving in direction B.

In this way an advantageous apparatus and method for taking a person into custody is provided which is secure and easy to operate.

One possible advantage of this arrangement lies in that it is conceivable that it may no longer be necessary for a law enforcement officer to leave a place of safety in order to approach a person to be taken into custody to apply the handcuffs, but once the restrainer has been set up on a secure object, the person to be taken into custody can be given instructions which result in the restrainer being applied without the intervention of a law enforcement officer, or another person. Therefore, the risk of an attack on a law enforcement officer during the restraint of a potentially dangerous person may be reduced. However, the use of the method and apparatus of the invention cannot eliminate the risks inherent in such a situation.

When the person needs to be released or transferred from the secure point to another place, the securing tie means must be released from the clamp to release the person or to enable another form of restraint, for example metal handcuffs or a fresh restraint in the form of securing ties, to be secured onto the person. In order to do this, first and second portions can be severed between the head ends 4*a*, 4*b* and the clamps 6*a*, 6*b* respectively, thus freeing the person. Since the first and second portions have been cut, the remaining ends thereof may be removed from the clamps 6*a*, 6*b* by pulling them in direction A.

Alternatively other means may be provided for allowing the restrained person to be freed, and the clamps made ready for re-use. For example, in the described embodiment the clamps may be provided with release means to withdraw the protruding part from the ridges so as to allow movement of the tail ends 5*a*, 5*b* in direction B. Obviously a release mechanism appropriate to the securing means must be used. However any such release means should be arranged to be operable only by the police officer, or other authorized person, and not by the person being restrained. The clamp is then ready for reuse.

As described above, the invention provides a particularly preferable method and apparatus for restraining a person.

Various modifications may be made to the arrangements described above, while still utilising the inventive concept of this application. The securing tie means has been shown as having a loop, suitable for reception of, for example, each hand of a person. However, it is possible to provide a single loop dimensioned to encircle both hands of the person to be restrained as shown in FIG. 4*a*. This would require the provision of only a single clamp 6. In addition in some situations parts of the person other than the hand, for example a leg, may be used to restrain the person, and the invention is not limited to the securing of the hand or both hands of a person.

In addition, it is not necessary that the first and second portions 1 and 2 are joined together, and the bridging portion may be omitted from the arrangement described without any effect on the functioning of the clamping means.

The clamps 6*a* and 6*b* have been described as acting on the first and second portions 1, 2 at a single point so as to prevent movement in direction B as shown in FIG. 6. It is advantageous, however, if the locking means of clamps 6*a*, 6*b* are arranged to act on the first and second portions 1, 2 respectively over a length of the first and second portions 1, 2, and/or to provide many securing points, so that the repeated use of the clamps 6*a*, 6*b* does not result in excessive wear of the locking means of the clamps 6*a*, 6*b*. In addition, the provision of many locking means results in less stress being applied to first and second portions 1, 2 by the securing means 6*a*, 6*b* during operation of the invention, thus reducing the possibility of damage to the first and second portions 1, 2 during operation of the invention.

The described embodiment of the invention utilises securing ties as first and second portions, although other arrangements may be used for achieving the same object.

The secure means is advantageously a police vehicle, and the police vehicle may advantageously be provided with a plurality of securing means thereon so as to enable the simultaneous restraint of a number of people. It is possible, however, to provide secure means on other objects. In particular, in places where there exists a reasonable possibility that the ability to restrain a person with the means and method described herein may be useful, for example in a prison, hospital, bank, aeroplane, or other public building or area, securing means may be provided securely fastened to, for example, the walls in order to facilitate the use of the restraining means and method of this invention.

The invention as described provides a useful clamp and clamping means for use by law enforcement officers, but may be used in other situations in which restraint of a person or animal is required, for example in hospitals and aeroplanes, outside shops, in veterinary centres or other places in which animals are to be restrained. The invention as described above also provides clamp and clamping means which is equally suitable for securely clamping objects to a surface or other fixed point.

It will be appreciated by a skilled person that the different devices and methods disclosed herein as being applicable to one use of the invention may be equally applied to any other use of the invention to secure an object or part of an animal or person to a fixed point, and the inventive concept is not limited to the described combinations.

What is claimed is:

1. A clamping means for securing an object to a fixed structure, the clamping means comprising:

(a) a securing tie which comprises an elongated flexible element having at a first end a tail provided with serrations along a length thereof, and at a second end an aperture through which the tail can pass to form a loop surrounding an object to be held to a fixed surface, the aperture having a pawl means therein which is engageable with the serrations to enable movement of the tail through the aperture in an insertion direction but to prevent movement of the tail in a withdrawal direction, and (b) a clamp which is separate from the securing tie and is adapted for fixing the securing tie to the fixed structure, the clamp having a body formed with a channel dimensioned to receive the tail of the securing tie, said body having a fastening means for securing the clamp to the fixed structure, said body having a locking means comprising a plurality of locking points which distribute the locking forces over a length of said tail, and said locking means being removable from said clamp to enable replacement of said locking means.

2. A clamping means as claimed in claim 1, wherein the clamp comprises means to attach the clamp permanently to the fixed structure.

3. A clamping means as claimed in claim 1, wherein the clamp comprises means to attach the clamp temporarily to the fixed structure.

4. A clamping means as claimed in claim 1, wherein the clamp is fixable to the fixed structure by means selected from a group consisting of: bolts; screws; contact cement; a securing tie; a suction pad; glue; a clip or clips; and a fastener.

5. A clamping means as claimed in claim 1, wherein the retaining aperture and the pawl means of the clamp are formed to receive and lock anyone of a plurality of differently sized securing tie tails.

6. A clamping means as claimed in claim 1, wherein the clamp has formed therein a plurality of differently sized retaining apertures and pawl means in each of said retaining apertures, so as to enable the reception and locking therein of any one of a plurality of differently sized securing tie tails.

7. A clamping means as claimed in claim 1, wherein the retaining aperture is larger at one end than at the other end of said retaining aperture.

8. A clamping means as claimed in claim 1, wherein the clamp is shaped or marked to indicate a preferred direction of insertion of the securing tie tail into the clamp.

9. A clamping means as claimed in claim 1, wherein the pawl means of the clamp is arranged so as to securely lock the securing tie regardless of the relative orientation of the securing tie tail and the pawl means.

10. A clamping means as claimed in claim 1, wherein the pawl means of the clamp is formed integrally with the clamp.

11. A clamping means as claimed in claim 1, further compromising means for preventing removal of locking means from said clamp.

12. A clamping means as claimed in claim 1, further comprising a release mechanism for enabling the release of the securing tie from the clamp.

13. A clamping means as claimed in claim 1 further comprising an intermediate locking block with which an intermediate tail is integrally formed.

14. A clamping means as claimed in claim 1 further comprising an intermediate locking block having a channel therethrough, and an intermediate tail comprising a further securing tie which passes through the channel.

* * * * *